United States Patent [19]
Sasaki et al.

[11] Patent Number: 5,345,132
[45] Date of Patent: Sep. 6, 1994

[54] VEHICULAR ALTERNATING CURRENT DYNAMO

[75] Inventors: Susumu Sasaki; Hisashi Wada; Takashi Oguri; Susumu Terumoto; Akihiro Saito, all of Hitachi, Japan

[73] Assignees: Hitachi Automotive Engineering, Tokyo; Hitachi, Ltd. and Co., Ltd., Ibaraki, both of Japan

[21] Appl. No.: 79,829

[22] Filed: Jun. 23, 1993

[30] Foreign Application Priority Data

Jun. 23, 1992 [JP] Japan .................................. 4-164957

[51] Int. Cl.$^5$ ............................................ H02K 13/00
[52] U.S. Cl. ...................... 310/239; 310/42; 310/62; 310/68 D; 310/89; 310/232
[58] Field of Search ............... 310/239, 88, 232, 68 D, 310/263, 89, 62, 63, 42, 51

[56] References Cited

U.S. PATENT DOCUMENTS

| | | | |
|---|---|---|---|
| 3,731,126 | 5/1973 | Hagenlocher et al. | 310/88 |
| 4,387,314 | 6/1983 | Iwaki et al. | 310/88 |
| 4,499,390 | 2/1985 | Iwaki et al. | 310/88 |
| 4,546,280 | 10/1985 | Pfluger | 310/68 D |
| 4,705,983 | 11/1987 | Franz et al. | 310/68 D |
| 4,959,576 | 9/1990 | Horibe et al. | 310/239 |

FOREIGN PATENT DOCUMENTS

| | | |
|---|---|---|
| 59-86851 | 6/1984 | Japan . |
| 60-2051 | 1/1985 | Japan . |
| 61-108069 | 7/1986 | Japan . |
| 62-48152 | 3/1987 | Japan . |
| 62-85659 | 4/1987 | Japan . |
| 62-101367 | 6/1987 | Japan . |
| 62-144551 | 6/1987 | Japan . |
| 63-64548 | 3/1988 | Japan . |
| 63-174536 | 7/1988 | Japan . |
| 63-198553 | 8/1988 | Japan . |
| 1-138952 | 5/1989 | Japan . |

Primary Examiner—R. Skudy
Attorney, Agent, or Firm—Evenson, McKeown, Edwards & Lenahan

[57] ABSTRACT

An object of the invention is to, in a vehicular alternating current (AC) dynamo, reduce an influence of vibration on a brush during operation, thereby preventing the brush from wobbling, cracking or causing other damages, also to make the brush sufficiently exposed to cooling air during operation, thereby preventing the brush temperature from rising excessively. In the vehicular AC dynamo, by virtue of a pressing force produced upon a tubular cover integral with a fan guide being fixed to a rear bracket through a seal member, an abutting end surface of a projection of the tubular cover is axially abutted with an inner abutting surface of a recess of the brush holder for pressing and fixing said brush holder against and to the rear bracket. In addition, the side of the fan guide and the side of the brush holder are arranged to be flush with each other, and a labyrinth seal structure is constituted by a circumferential groove of an end flange and a cylindrical projection which is formed by both the tubular cover and the brush holder.

7 Claims, 4 Drawing Sheets

VEHICULAR ALTERNATING CURRENT DYNAMO

BACKGROUND OF THE INVENTION

The present invention relates to a vehicular alternating current (AC) dynamo which can prevent vibration of brush and an excessive rise in its temperature.

As disclosed in JP, A, 62-144551, for example, the conventional protective structure for a brush surrounding region of a vehicular AC dynamo is arranged as follows. A fan guide is provided to serve as a member for introducing air induced by a cooling fan fixed to a rotor coil. This fan guide and a tubular cover surrounding a slip ring are integrally molded using a resin. The tubular cover is provided with a cutout having two parallel edges extended parallel to a rotary shaft. These two parallel edges and engagement portions (recesses) formed in the side of a brush holder are engaged with each other, thereby improving a sealing ability for a portion of the slip ring which is held in slide contact with a brush.

SUMMARY OF THE INVENTION

With the foregoing prior art, an improvement in the sealing ability is expected. However, because the two parallel edges of the tubular cover and the engagement portions (recesses) formed in the side of the brush holder have no function of fixing the brush holder in the axial direction of the tubular cover, the brush holder is supported in cantilever fashion such that the center of gravity of the brush holder is offset from the point where it is fixed to a bracket. When the brush holder is subjected to vibration, stresses in the vicinity of its fixed point is so increased that the brush may wobble, crack or cause other damages. Further, because of the presence of the fan guide between the cooling fan and the side of the brush holder, the cooling air induced by the cooling fan is hard to reach the brush holder, resulting in that the brush temperature may be so raised as to increase electric resistance of the brush or shorten its service life.

A first object of the present invention is to provide a vehicular AC dynamo in which a brush is less subjected to vibration during operation and hence the brush is prevented from wobbling, cracking or causing other damages.

A second object of the present invention is to provide a vehicular AC dynamo in which a brush is sufficiently exposed to cooling air during operation and the brush temperature is prevented from rising excessively.

To achieve the above first object, according to the present invention, there is provided a vehicular alternating current dynamo comprising a rotor fixedly mounted to a rotary shaft driven by a vehicular engine and having a rotor coil wound around said rotor, a cooling fan fixed to the side of said rotor, a slip ring assembly fixedly fitted over said rotary shaft to position near said rotor coil and comprised of a slip ring and an end flange, a brush holder accommodating a brush held in slide contact with said slip ring, a tubular cover disposed to surround said slip ring and formed in its peripheral wall with an opening to which said brush holder is inserted, a rear bracket for supporting said rotary shaft, a rectifier disposed inwardly of said rear bracket, and a fan guide positioned to face said cooling fan and said end flange from the side opposite to said rotor and fixed to said rear bracket through said rectifier, said tubular cover and said fan guide being molded integrally with each other, the opening of said tubular cover and said brush holder having respective fitting portions in the form of a projection and a recess which are parallel to the axial direction and engageable with each other, wherein said fitting portions of the opening of said tubular cover and said brush holder have axially abutting portions through which said brush holder is pressed against and fixed to said rear bracket by virtue of a pressing force produced when said fan guide integral with said tubular cover is fixed to said rear bracket.

Preferably, said vehicular alternating current dynamo further comprises seal means between said tubular cover and said rear bracket, said seal means being pressed against and fixed to said rear bracket by virtue of the pressing force produced when said fan guide integral with said tubular cover is fixed to said rear bracket.

Preferably, a labyrinth seal structure comprising a projection and a recess positioned adjacent to each other is formed between the end flange of said slip ring assembly and the end of said tubular cover facing said cooling fan.

To achieve the above second object, according to the present invention, in said vehicular alternating current dynamo, the side of said brush holder facing said cooling fan and the side of said fan guide facing said cooling fan are arranged to be substantially flush with each other so that the side of said fan guide facing said cooling fan is exposed to a space including said cooling fan.

Preferably, said tubular cover and said brush holder are provided at their ends facing said cooling fan with respective arc-shaped projections to cooperatively form a cylindrical projection, and a labyrinth seal structure comprising a projection and a recess positioned adjacent to each other is formed between the end flange of said slip ring assembly and both the arc-shaped projections of said tubular cover and said brush holder.

Furthermore, preferably, said brush holder and said tubular cover have substantially the same axial length.

With the present invention constituted as set forth above, the brush holder is inserted and assembled to the tubular cover by mutually closely fitting the respective fitting portions in the form of a projection and a recess extended parallel to the axial direction which are provided on an edge of the opening of the tubular cover, integral with the fan guide, and the brush holder. At this time, by virtue of the pressing force produced upon the fan guide integral with the tubular cover being fixed to the rear bracket, the respective abutting portions are axially abutted with each other for pressing and fixing the brush holder against and to the rear bracket. Accordingly, the brush holder is not supported in cantilever fashion such that the center of gravity thereof is offset from the point where it is fixed to the rear bracket, resulting a reduced influence of vibration upon the brush.

Also, the seal means is interposed between the tubular cover and the rear bracket to be pressed against the rear bracket by virtue of the pressing force produced upon the fan guide integral with the tubular cover being fixed to the rear bracket. Accordingly, the seal member is uniformly pressed in the axial direction to improve the sealing ability for the slide contact portion between the slip ring and the brush, thereby preventing dirty water and dust or dirt from entering the slide contact portion.

With the labyrinth seal structure, comprising a projection and a recess positioned adjacent to each other, formed between the end flange of the slip ring assembly and the end of the tubular cover facing the cooling fan, the slide contact portion between the slip ring and the brush can be sealed with a higher sealing ability to more positively prevent dirty water and dust or dirt from entering the slide contact portion.

By arranging the side of the brush holder facing the cooling fan and the side of the fan guide facing the cooling fan to be flush with each other so that the former side is exposed to the space including the cooling fan, the cooling air induced by the cooling fan is allowed to strike against the brush holder in a sufficient amount. Accordingly, it is possible to prevent the brush temperature from excessively rising, thereby avoiding an increase in electric resistance of the brush or a reduction in the service life thereof.

Further, by providing the arc-shaped projections at the respective ends of the tubular cover and the brush holder on their sides facing the cooling fan so as to cooperatively form the cylindrical projection, and by forming the labyrinth seal structure comprising a projection and a recess positioned adjacent to each other between those arc-shaped projections and the end flange of the slip ring assembly, it is possible to not only improve the sealing ability for the slide contact portion between the slip ring and the brush, as mentioned above, but also absorb dimensional errors of the brush holder and the tubular cover through the opening of the tubular cover at the time the former is inserted to the latter for assembly, thereby facilitating the insertion and assembly of the brush holder.

In addition, with the above arrangement, the brush holder and the tubular cover can be made to have substantially the same axial length, whereby the length of the rotary shaft and hence the axial dimension of the dynamo itself can be shortened.

DETAILED DESCRIPTION OF THE PREFERRED EMBODIMENTS

A vehicular AC dynamo according to one embodiment of the present invention will be described hereinafter with reference to FIGS. 1 to 4.

Figure 1:
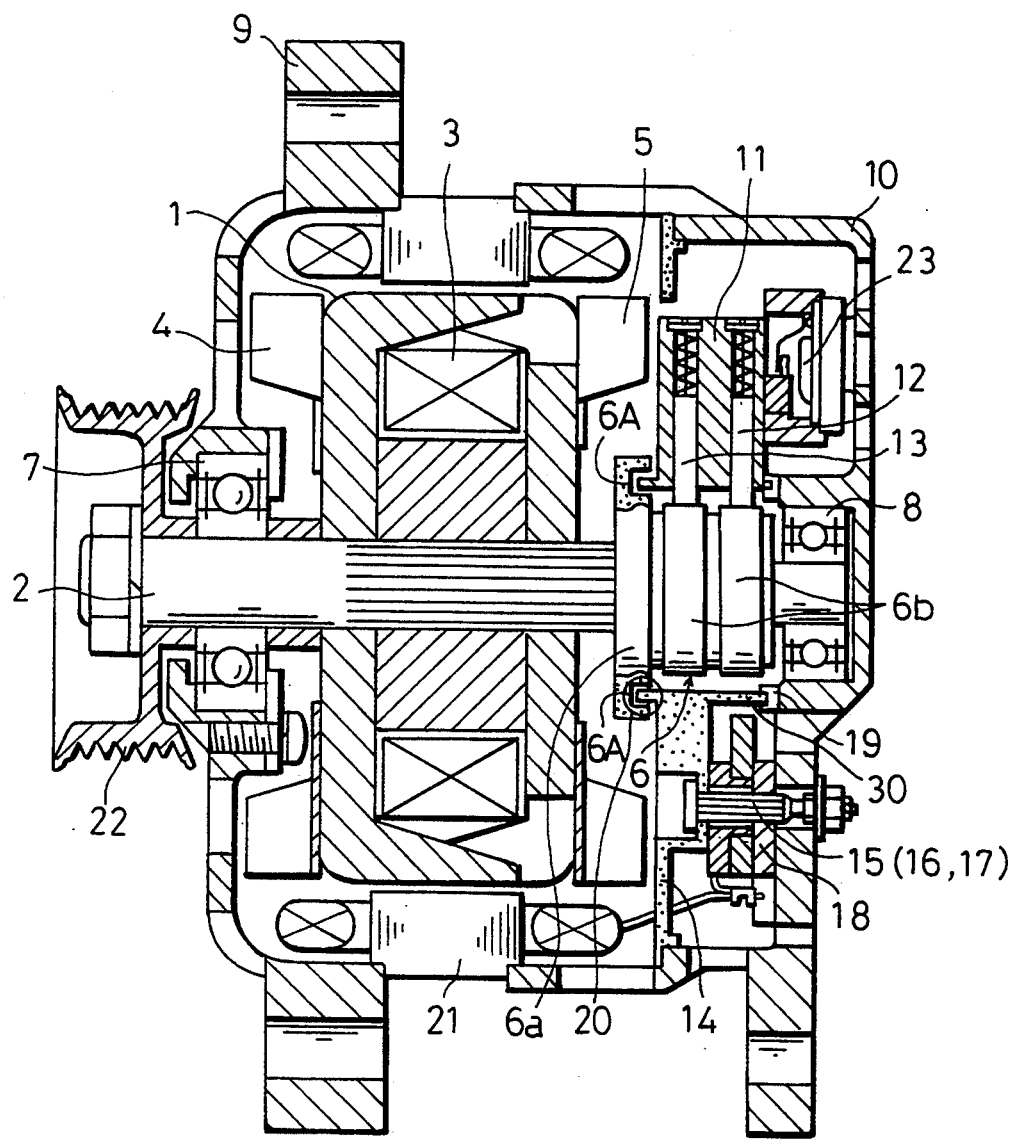
FIG. 1 is a sectional view showing a vehicular AC dynamo according to one embodiment of the present invention.

FIG. 1 is a sectional view showing the structure of the vehicular AC dynamo according to this embodiment. As shown in FIG. 1, a rotor 1 is fixedly mounted to a rotary shaft 2 and has a rotor coil 3 wound around it, with cooling fans 4 and 5 fixed to both sides of the rotor 1. A slip ring assembly 6 is press-fitted over the end of the rotary shaft 2 opposite to the side to which torque from an engine is transmitted. The slip ring assembly 6 comprises an end flange 6a on the side closer to the rotor 1 and a slip ring 6b on the side remoter from the rotor 1, the slip ring assembly 6 being electrically connected to the rotor coil 3. The rotary shaft 2 is supported by a front bracket 9 and a rear bracket 10 through bearings 7 and 8, respectively. Brushes 12 and 13 are accommodated in and supported by the brush holder 11 in such a manner that they are held in slide contact with corresponding portions of the slip ring 6b, whereby an induced current from the rotor coil 3 is collected by the brushes 12 and 13 through the respective slide contact portions of the slip ring 6b. A tubular cover 30 is disposed so as to surround the slip ring 6b and formed in its peripheral wall with an opening 31 (see FIGS. 3 and 4) to which the brush holder 11 is inserted.

Further, a stator 21 is fixedly sandwiched between the front bracket 9 and the rear bracket 10. A pulley 22 transmits the torque from the engine (not shown) to the rotary shaft 2 through a belt or the like (not shown). A voltage adjuster 23 is disposed in overlap relation to the brush holder 11 and fixed, along with a fan guide 14, to the rear bracket 10 by bolts 24, 25 (see FIG. 2).

Figure 2:
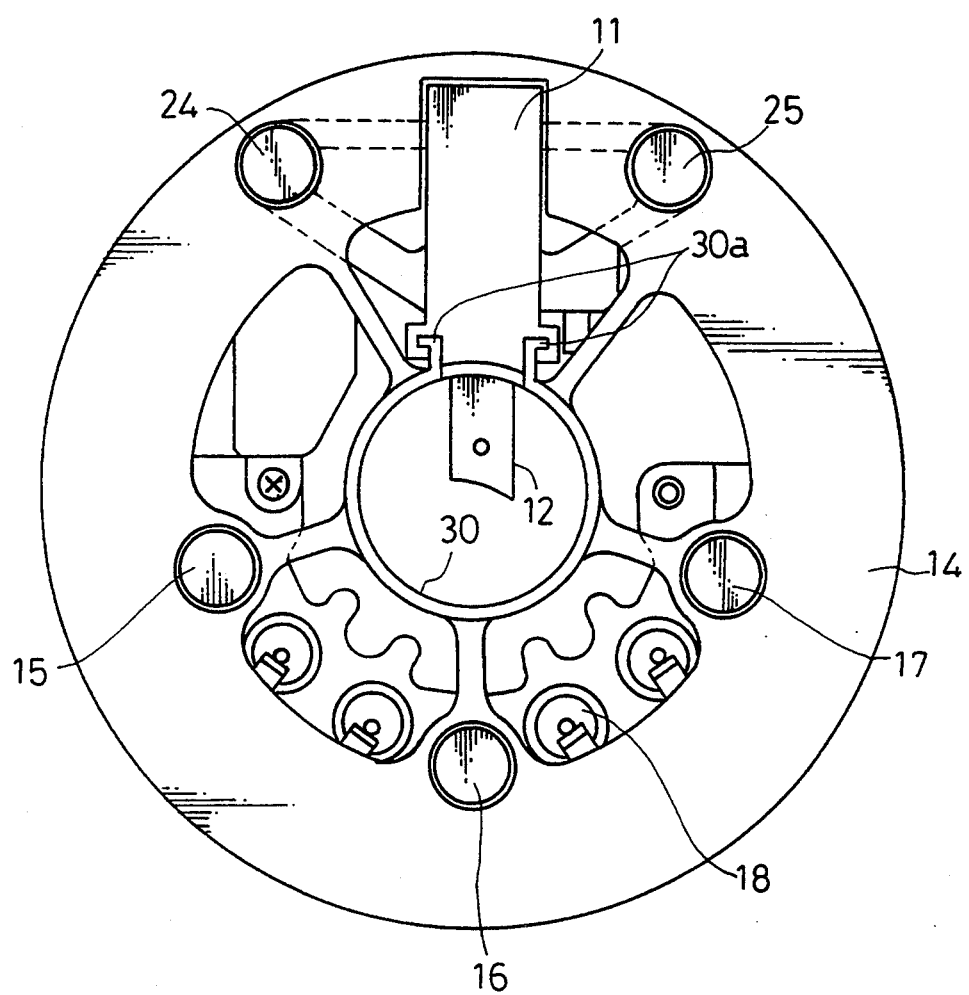
FIG. 2 is a representation of a fan guide of the vehicular AC dynamo shown in FIG. 1, as viewed from the cooling fan side.
Figure 3:
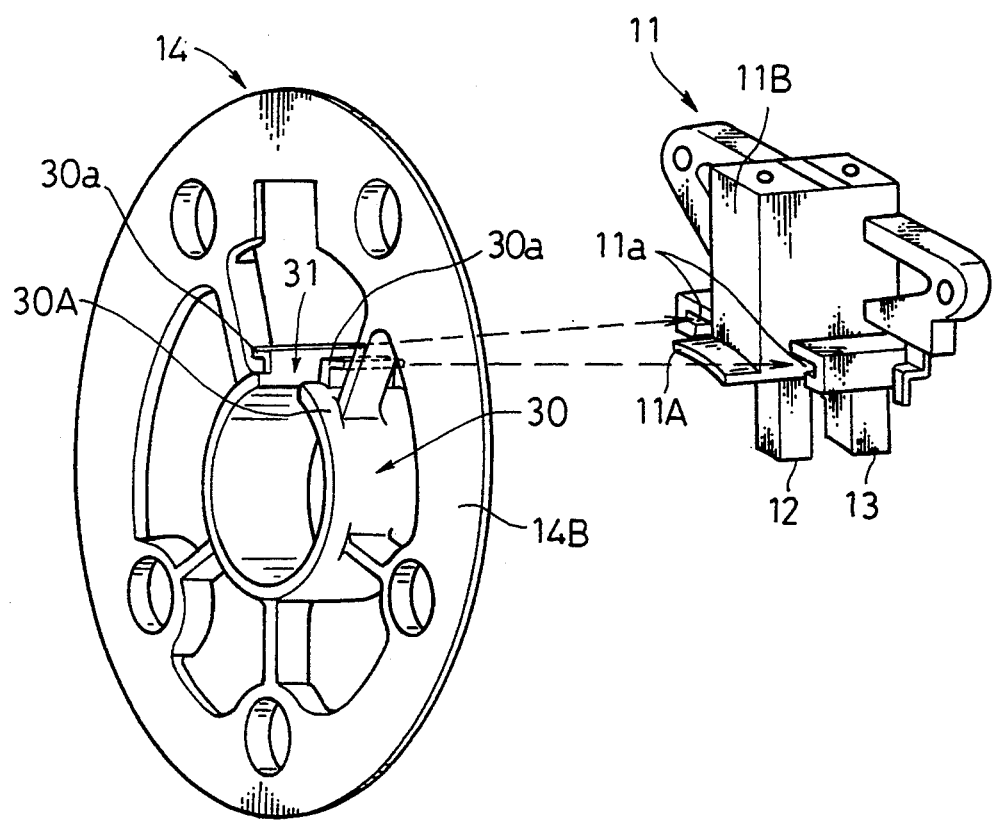
FIG. 3 is an exploded perspective view for explaining an assembly step in which a tubular cover integral with the fan guide shown in FIG. 2 is inserted to a brush holder.

As shown in FIG. 2, the fan guide 14 is pressed against and fixed to the rear bracket 10 by bolts 15, 16, 17, 24 and 25. A rectifier 18 is sandwiched between the fan guide 14 and the rear bracket 10 (see FIG. 1) such that the rectifier 18 is also pressed against and fixed to the rear bracket 10 at the same time as when the fan guide 14 is pressed against and fixed to the rear bracket 10. Also, as shown in FIG. 3, the fan guide 14 is molded integrally with the tubular cover 30 using any suitable material such as a resin. The tubular cover 30 has a pair of projections 30a formed at axial edges of the opening 31 thereof and extended parallel to the axial direction, while the brush holder 11 has a pair of recesses 11a formed parallel to the axial direction and capable of fitting with the corresponding projections 30a of the tubular cover 30. By closely fitting the projections 30a to the recesses 11a, the brush holder 11 is inserted to the opening 31 of the tubular cover 30.

Figure 4:
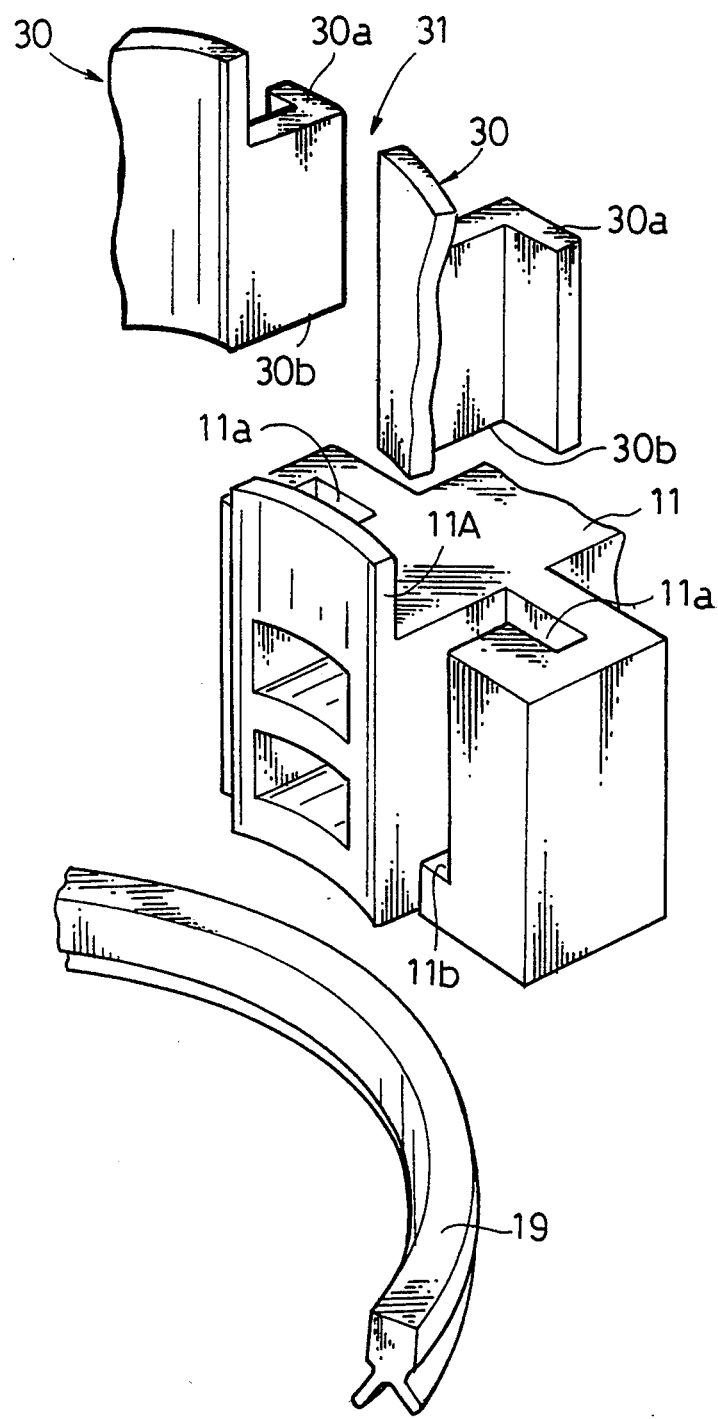
FIG. 4 is an exploded perspective view showing how projections of the tubular cover, provided at both edges of its opening, are fitted into recesses of the brush holder in relation to FIG. 3.

In addition, as shown in FIG. 4, each of the recesses 11a formed in the brush holder 11 is not penetrating through the brush holder 11 in the axial direction, but terminated at an inner abutting surface 11b. This inner abutting surface 11b as one abutting portion constitutes the abutting structure in cooperation with an abutting end surface 30b, as the other abutting portion, of each of the projection 30a provided on the tubular cover 30 which is integral with the fan guide 14. By virtue of a pressing force produced when the fan guide 14 is fixed to the rear bracket 10 by the fan guide bolts 24, 25, the abutting end surfaces 30b of the projections 30a are axially brought into abutment with the inner abutting surfaces 11b of the recesses 11a. In this way, the brush holder 11 is pressed against and fixed to the rear bracket 10 through the voltage adjuster 23.

Accordingly, the brush holder 11 is pressed against the rear bracket 10 not only through the voltage adjuster 23 by the fan guide bolts 24, 25 serving to press and fix the fan guide 14 against and to the rear bracket 10, but also through the abutting structure that the abutting end surfaces 30b of the projections 30a are abutted with the inner abutting surfaces 11b of the recesses 11a. As a result, the brush holder 11 is not supported in cantilever fashion such that the center of gravity thereof is offset from the point where it is fixed to the rear bracket, whereby an influence of vibration upon the brush holder 11 is reduced and hence an influence of vibration upon the brushes 12, 13 is also reduced.

A seal member 19 (see FIG. 1) formed of any suitable material such as rubber is interposed between the tubular cover 30 and the rear bracket 10. By virtue of the pressing force produced when the fan guide 14 is fixed to the rear bracket 10 by the fan guide bolts 24, 25, the tubular cover 30 integral with the fan guide 14 uniformly presses the seal member 19 in the axial direction. The slide contact portions between the slip ring 6b and the brushes 12, 13 are thereby uniformly and surely sealed.

Moreover, as shown in FIG. 3, arc-shaped projections 30A and 11A are provided at the end of the tubular cover on the side facing the cooling fan 5 and at the end of the brush holder 11 on the side facing the cooling fan 5, respectively, in concentric relation to the rotary shaft 2. When the brush holder 11 is inserted to the opening 31 of the tubular cover 30 for assembly, as mentioned above, both the arc-shaped projections 30A and 11A are complementarily mated with each to form a cylindrical projection. On the other hand, a circumferential groove 6A (see FIG. 1) is defined in the side of the end flange 6a facing the fan guide 14. The cylindrical projection formed by the mating arc-shaped projections 30A and 11A and the circumferential groove 6A are located adjacent to each other in fitting relation while leaving gaps therebetween, for providing a labyrinth seal structure. With this labyrinth seal structure, the slide contact portions between the slip ring 6b and the brushes 12, 13 can be sealed more positively to prevent dirty water and dust or dirt from entering those slide contact portions. Additionally, since the arc-shaped projections 30A and 11A are complementarily mated with each to form the cylindrical projection upon the brush holder 11 being inserted to the opening 31 of the tubular cover 30 for assembly, dimensional errors of the brush holder 11 and the tubular cover 30 can be absorbed by deflection of the tubular cover 30 through its opening 31 in assembly, resulting in that the insertion and assembly of the brush holder 11 is facilitated.

Further, when the brush holder 11 is inserted to the opening 31 of the tubular cover 30 for assembly, the side 11B (see FIG. 3) of the brush holder 11 facing the cooling fan 5 is arranged to be flush with the side 14B (see FIG. 3) of the fan guide 14 facing the cooling fan 5 so that the former side 11B is exposed to a space including the cooling fan 5. With such an arrangement, cooling air induced by the cooling fan 5 is allowed to strike against the brush holder 11 in a sufficient amount. The brush holder 11 and hence the brushes 12, 13 can be thereby prevented from excessively rising in temperature, making it possible to avoid an increase in electric resistance of the brushes or a reduction in the service life thereof. The above arrangement also enables the tubular cover 30 to have an axial length substantially equal to that of the brush holder 11, with the result of that the length of the rotary shaft 2 and hence the axial dimension of the dynamo itself can be shortened.

With this embodiment, as described above, the brush holder 11 is inserted to the opening 31 of the tubular cover 30 while closely fitting the projections 30a and the recesses 11a to each other and, by virtue of the pressing force produced upon the fan guide 14 integral with the tubular cover 30 being fixed to the rear bracket 10, the abutting end surfaces 30b of the projections 30a are axially brought into abutment with the inner abutting surfaces 11b of the recesses 11a to thereby press and fix the brush holder 11 against and to the rear bracket 10 through the voltage adjuster 23. Therefore, the brush holder 11 is not supported in cantilever fashion such that the center of gravity thereof is offset from the point where it is fixed to the rear bracket. Accordingly, an influence of vibration upon the brush holder 11 is reduced and hence an influence of vibration upon the brushes 12, 13 accommodated in the brush holder 11 is also reduced, thus preventing the brushes from wobbling, cracking or causing other damages.

Also, the seal member 19 interposed between the tubular cover 30 and the rear bracket 10 is pressed against the rear bracket 10 by virtue of the pressing force produced upon the fan guide 14 integral with the tubular cover 30 being fixed to the rear bracket 10, causing the seal member 19 to be uniformly pressed in the axial direction. Therefore, the sealing ability for the slide contact portions between the slip ring 6b and the brushes 12, 13 can be so improved as to surely prevent dirty water and dust or dirt from entering those slide contact portions.

The arc-shaped projections 30A and 11A respectively provided on the tubular cover 30 and the brush holder 11 are complementarily mated with each to form the cylindrical projection when they are assembled, and the cylindrical projection is located adjacent to the circumferential groove 6A of the end flange 6a in such a manner as to provide the labyrinth seal structure. Therefore, the slide contact portions between the slip ring 6b and the brushes 12, 13 can be sealed with a higher sealing ability to more positively prevent dirty water and dust or dirt from entering those slide contact portions. Additionally, when the brush holder 11 is inserted to the tubular cover 30 for assembly, dimensional errors of both the members can be absorbed by deflection of the tubular cover 30 through its opening 31, whereby the insertion and assembly of the brush holder 11 is facilitated.

Furthermore, the side 11B of the brush holder 11 facing the cooling fan 5 and the side 14B of the fan guide 14 facing the cooling fan 5 are arranged to be flush with each other so that the former side 11B is exposed to the space including the cooling fan 5, allowing the cooling air to strike against the brush holder 11 in a sufficient amount. Accordingly, it is possible to prevent the brush holder 11 and hence the brushes 12, 13 from excessively rising in temperature, thereby avoiding an increase in electric resistance of the brushes or a reduction in the service life thereof. In addition, the axial length of the tubular cover 30 can be reduced to make the axial dimension of the dynamo itself shorter.

According to the present invention, as will be apparent from the above, since a brush holder is pressed against and fixed to a rear bracket under a condition that respective abutting portions of the brush holder and a tubular cover are axially abutted with each other by virtue of a pressing force produced upon a fan guide being fixed to the rear bracket, the brush holder is not supported in cantilever fashion such that the center of gravity thereof is offset from the point where it is fixed to the rear bracket. As a result, an influence of vibration upon a brush is reduced and the brush is prevented from wobbling, cracking or causing other damages.

Since seal means interposed between the tubular cover and the rear bracket is uniformly pressed against the rear bracket in the axial direction by virtue of the pressing force produced upon the fan guide being fixed to the rear bracket, the sealing ability for the slide contact portion between a slip ring and the brush can be so improved as to surely prevent dirty water and dust or dirt from entering the slide contact portion.

Since a labyrinth seal structure is formed between an end flange of the slip ring assembly and the tubular cover, the slide contact portion between the slip ring and the brush can be sealed with a higher sealing ability to more positively prevent dirty water and dust or dirt from entering the slide contact portions Since the side of the brush holder facing a cooling fan and the side of the fan guide facing the cooling fan are arranged to be flush with each other so that the former side is exposed to a space including the cooling fan, cooling air is allowed to strike against the brush holder in a sufficient amount. Accordingly, it is possible to prevent the brush temperature from excessively rising, thereby avoiding an increase in electric resistance of the brush or a reduction in the service life thereof.

Since a labyrinth seal structure is formed between arc-shaped projections, which are provided at respective ends of the tubular cover and the brush holder on their sides facing the cooling fan so as to cooperatively form a cylindrical projection, and the end flange of the slip ring assembly, it is possible to not only improve the sealing ability, but also absorb dimensional errors when the brush holder is inserted to the tubular cover for assembly, thereby facilitating the assembly.

In addition, since the brush holder and the tubular cover can be made to have substantially the same axial length, the axial dimension of the dynamo itself can be shortened.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A vehicular alternating current dynamo comprising a rotor fixedly mounted to a rotary shaft driven by a vehicular engine and having a rotor coil wound around said rotor, a cooling fan fixed to a side of said rotor, a slip ring assembly fixedly fitted over said rotary shaft to position near said rotor coil and comprised of a slip ring and an end flange, a brush holder accommodating a brush held in slide contact with said slip ring, a tubular cover disposed to surround said slip ring and formed in its peripheral wall with an opening to which said brush holder is inserted, a rear bracket for supporting said rotary shaft, a rectifier disposed inwardly of said rear bracket, and a fan guide positioned to face said cooling fan and said end flange from a side opposite to said rotor and fixed to said rear bracket through said rectifier, said tubular cover and said fan guide being molded integrally with each other, the opening of said tubular cover and said brush holder having respective fitting portions in a form of a projection and a recess which are parallel to an axial direction and engageable with each other, wherein:
said fitting portions of the opening of said tubular cover and said brush holder have axially abutting portions through which said brush holder is pressed against and fixed to said rear bracket by virtue of a pressing force produced when said fan guide integral with said tubular cover is fixed to said rear bracket.

2. A vehicular alternating current dynamo according to claim 1, further comprising seal means between said tubular cover and said rear bracket, said seal means being pressed against and fixed to said rear bracket by virtue of the pressing force produced when said fan guide integral with said tubular cover is fixed to said rear bracket.

3. A vehicular alternating current dynamo according to claim 1, wherein a labyrinth seal structure comprising a projection and a recess positioned adjacent to each other is formed between the end flange of said slip ring assembly and the end of said tubular cover facing said cooling fan.

4. A vehicular alternating current dynamo according to claim 1, wherein a side of said brush holder facing said cooling fan and a side of said fan guide facing said cooling fan are arranged to be substantially flush with each other so that the side of said fan guide facing said cooling fan is exposed to a space including said cooling fan.

5. A vehicular alternating current dynamo according to claim 4, wherein said tubular cover and said brush holder are provided at their ends facing said cooling fan with respective arc-shaped projections to cooperatively form a cylindrical projection, and a labyrinth seal structure comprising a projection and a recess positioned adjacent to each other is formed between the end flange of said slip ring assembly and both the arc-shaped projections of said tubular cover and said brush holder.

6. A vehicular alternating current dynamo according to claim 4, wherein an axial length of said brush holder and said tubular cover are substantially the same.

7. A vehicular alternating current dynamo comprising a rotor fixedly mounted to a rotary shaft driven by a vehicular engine and having a rotor coil wound around said rotor, a cooling fan fixed to a side of said rotor, a slip ring assembly fixedly fitted over said rotary shaft to position near said rotor coil and comprised of a slip ring and an end flange, a brush holder accommodating a brush held in slide contact with said slip ring, a tubular cover disposed to surround said slip ring and formed in its peripheral wall with an opening to which said brush holder is inserted, a rear bracket for supporting said rotary shaft, a rectifier disposed inwardly of said rear bracket, and a fan guide positioned to face said cooling fan and said end flange from a side opposite to said rotor and fixed to said rear bracket through said rectifier, said tubular cover and said fan guide being molded integrally with each other, the opening of said tubular cover having projections which are parallel to an axial direction and said brush holder having recesses which are engageable with said projections, wherein:
said projections of the opening of said tubular cover have abutting end surfaces;
said recesses of said brush holder have inner abutting surfaces for abutting with said abutting end surfaces of said projections of said tubular cover;
said brush holder is pressed against and fixed to said rear bracket by bringing said abutting end surfaces of said projections into abutment with said inner abutting surfaces of said recesses by virtue of a pressing force produced when said fan guide, integral with said tubular cover, is fixed to said rear bracket.

* * * * *